United States Patent [19]

Evans et al.

[11] 4,270,251

[45] Jun. 2, 1981

[54] MUFFLER CLAMP AND METHOD OF MAKING SAME

[75] Inventors: Ralph K. Evans, Plantsville; Roy S. Florian, Southington, both of Conn.

[73] Assignee: Nickson Industries, Inc., Plantsville, Conn.

[21] Appl. No.: 25,340

[22] Filed: Mar. 30, 1979

[51] Int. Cl.³ .................. B65D 63/00; F16L 21/06
[52] U.S. Cl. .................................. 24/277; 285/420; 285/424
[58] Field of Search ............... 24/277; 285/382.2, 420, 285/424; 113/116 W

[56] References Cited

U.S. PATENT DOCUMENTS

| | | | |
|---|---|---|---|
| 2,959,834 | 11/1960 | Graham et al. | 24/277 |
| 3,040,407 | 6/1962 | Brown | 24/277 |
| 3,889,984 | 6/1975 | Lambiris | 24/277 |
| 3,919,747 | 11/1975 | Offterdinger | 24/277 |
| 3,955,250 | 5/1976 | Heckethorn | 24/277 |
| 3,984,134 | 10/1976 | Engman et al. | 24/277 |
| 4,056,869 | 11/1977 | Eisma, Jr. | 24/277 |

*Primary Examiner*—Alexander Grosz

[57] ABSTRACT

A saddle member for a saddle clamp is generally U-shaped in cross section. Generally parallel side walls are spaced apart and have arcuate free ends. A base extends between the side walls opposite the free ends, and end walls extend between the side margins of the side walls. The end walls include flanges on the side walls and the base and weldments that extend along substantially the entire lengths of the side-wall flanges to provide end walls that form continuous surfaces with both the side walls and the base.

7 Claims, 10 Drawing Figures

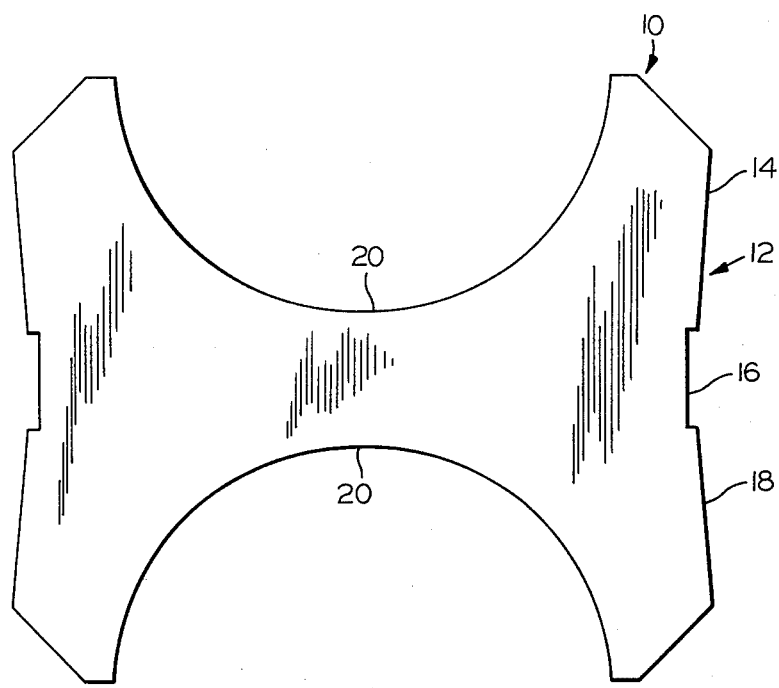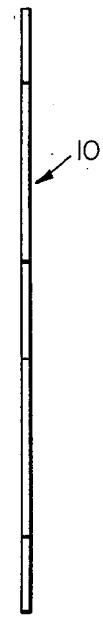
FIG.1  FIG.2
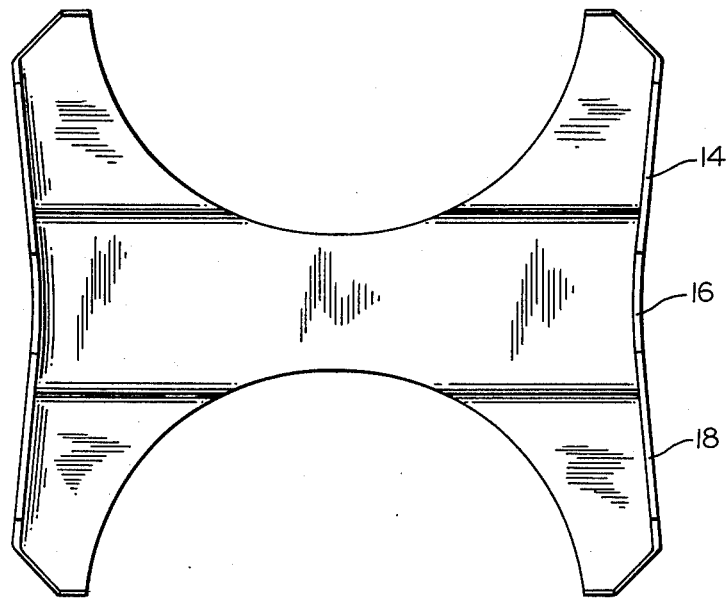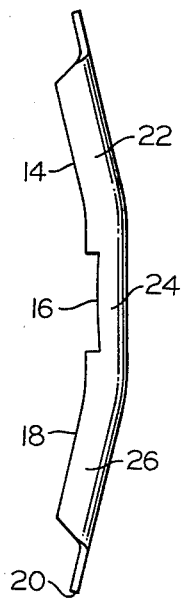
FIG.3  FIG.4
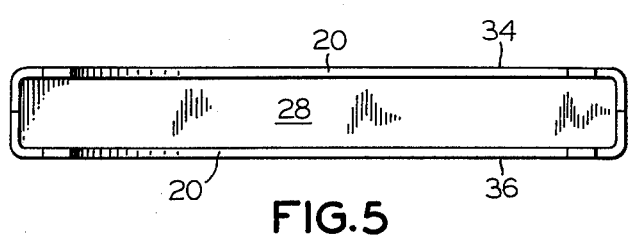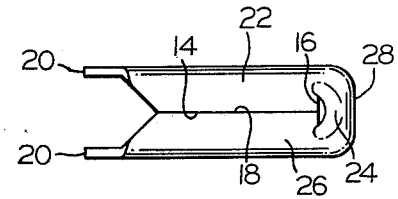
FIG.5  FIG.6

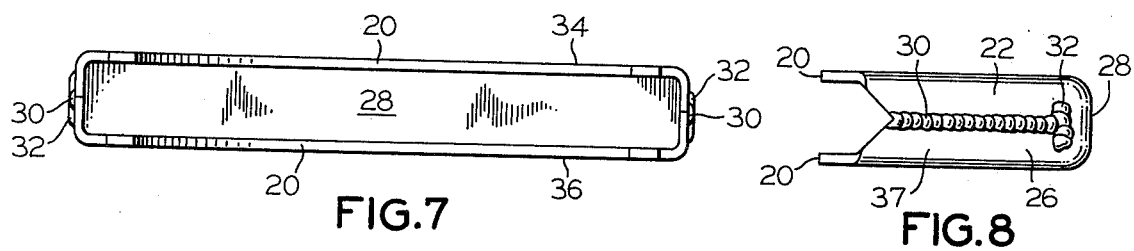
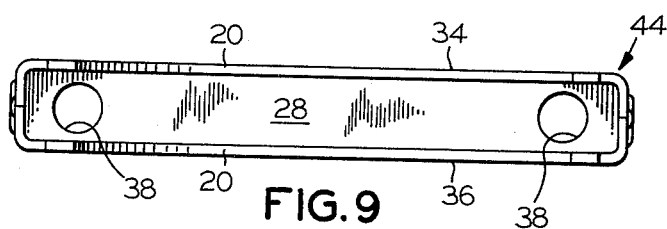
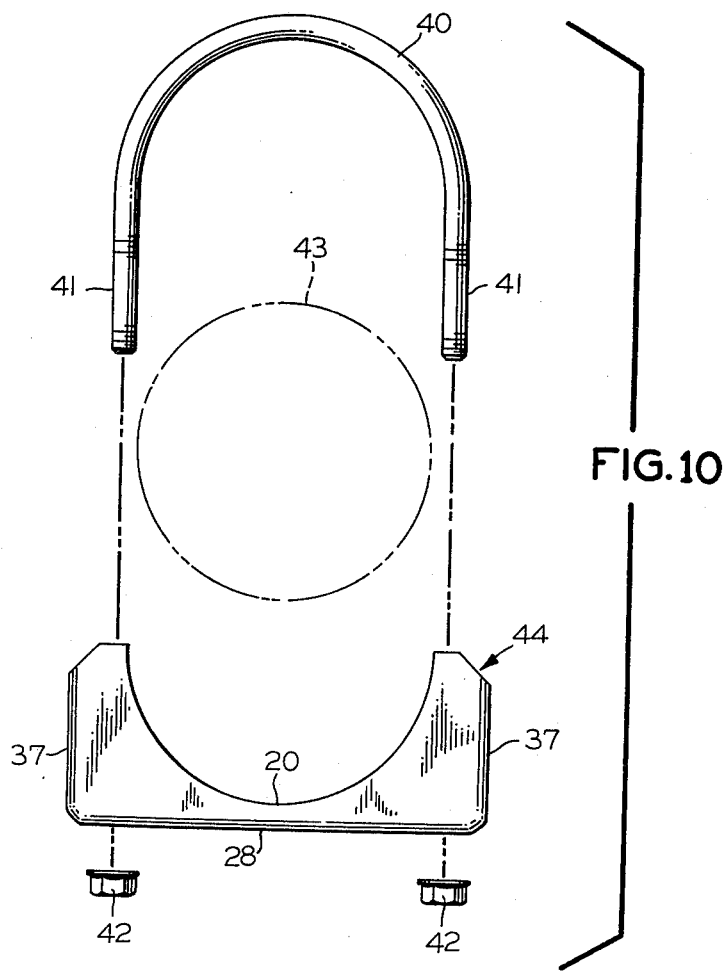

4,270,251

MUFFLER CLAMP AND METHOD OF MAKING SAME

BACKGROUND OF THE INVENTION

The present invention relates to saddle clamps, among whose uses is the provision of a seal between a muffler and a tailpipe.

It is typical for the tubular outlet of a muffler to be joined to a similarly shaped tailpipe by inserting one inside the other and clamping around the outer member to deform it into sealing relationship with the inner member. The deformation process requires a certain minimum amount of stress to be applied to the conduit members, of course, so the clamps must be strong enough to apply the stress without deforming themselves. On the other hand, obvious commercial considerations dictate that the clamp require a minimum of material and manufacturing complexity.

The typical clamp for this type of use is the saddle clamp, which includes a bight member with an arcuate portion and a saddle member with a complementary arcuate edge. The saddle member receives leg portions of the bight member, and the tailpipe and the muffler outlet are disposed between the two saddle-clamp parts. Nuts tighten the bight member against the saddle member to deform the tailpipe and muffler outlet into a sealing relationship, and it is at this point that inadequacies in poor designs come to light. Depending on a number of factors, the base of the saddle member may bow when the clamp is tightened, thereby preventing proper contact and effective sealing around part of the periphery of the pipe. The parallel faces also may bow, which will affect the arcuate shape of the sealing edge. It is also possible for the faces to part near their upper ends, further detracting from the sealing ability of the clamp. Thus, it is required of a proper design that the requisite structural strength be provided the saddle member, but ever-present economic considerations also dictate that the amount of material required be limited and that the design permit inexpensive manufacturing techniques.

It is accordingly an object of the present invention to afford structural strength in a saddle member without requiring excessive material or complex manufacturing techniques.

SUMMARY OF THE INVENTION

The foregoing and related objects are achieved in a novel saddle member for a saddle clamp. The saddle member includes a generally U-shaped body portion provided by a pair of spaced-apart, generally parallel side wall portions and a base portion extending between them. End wall portions extend between the side margins of the side wall portions. Each of the end wall portions includes oppositely extending side-wall flanges on the side margins of the side wall portions, base flanges extending from the base portion to the side-wall flanges, and weldments rigidly bonding together the opposed edges of the side-wall flanges and bonding the edge of the base flange to the side-wall flanges.

In the preferred embodiment, the weldments extend substantially the entire length of the side-wall flanges. The base portion is substantially planar in the preferred embodiment, and the side wall portions have matching aligned arcuate free edges opposite the base portion and convex relative to it.

The saddle member will normally have a pair of holes through the base portion that are spaced from the side walls and adapted to receive leg portions of a U-shaped bight member.

The saddle clamp in which the saddle member is included will include a U-shaped bight member having a pair of parallel leg portions extending through the base-portion holes and an arcuate web portion concave relative to the side wall portions. Means are provided in such clamps for tightening the bight member to the saddle member. In one version of the clamp, the leg portions of the bight member include threaded portions on their free ends. The tightening means includes nuts threadedly engaging the threaded portions of the bight-member leg portions on the other side of the saddle-member web portion. The nuts bear against the outer surface of the saddle-member base portion.

There is also taught in this specification a method of manufacturing this type of saddle member. The method includes the step of folding an integral sheet-metal blank having opposite first edges and second edges extending between the first edges. The folding is along lines extending along and adjacent the second edges so that upstanding flange portions are formed. The blank is also folded between the second edges along a pair of parallel lines extending transversely thereof to form a generally U-shaped body portion. The body portion is provided by a pair of spaced-apart, generally parallel side wall portions and a base portion extending between them. The flange portions thereby provide oppositely extending side-wall flange regions on the side margins of the side wall portions and base flange regions extending from the base portion toward the side-wall flange regions. The method further includes welding the side-wall flange regions together at the second edges and the base flange regions at their transverse edges to the side-wall flange regions. End wall portions of the saddle member are thereby formed that include the side-wall flange regions and the base flange regions of the flange portions. The end wall portions thereby form a continuous surface with the side wall portions and the base portion.

Preferably, the method also includes providing the sheet-metal blank with a recess in each of the second edges, and the second folding step includes folding along lines extending between the recesses substantially at their corresponding ends.

In the preferred embodiment, the folding steps are performed by progressive stamping of the blank. The holes are punched in the base portion after the folding steps, and specifically after the welding step.

BRIEF DESCRIPTION OF THE DRAWINGS

These and further features and advantages of the present invention are described in connection with the attached drawings, in which:

FIGS. 1 and 2 are plan end views, respectively, of a sheet-metal blank seen at the beginning of the method of the present invention;

FIGS. 3 and 4 are similar views after the first stamping step of the preferred method of manufacture;

FIGS. 5 and 6 are similar views of the workpiece after the second stamping step of the preferred embodiment of the method of the present invention;

FIGS. 7 and 8 are similar views taken after the welding step of the present invention;

FIG. 9 is a plan view of the finished saddle member after holes have been punched therein; and FIG. 10 is an exploded side view of a saddle clamp employing the saddle member of the preferred embodiment.

DETAILED DESCRIPTION OF THE PREFERRED EMBODIMENT

The several figures illustrate the method employed to manufacture the saddle member 44 shown in completed form in FIGS. 9 and 10. As FIG. 10 shows, the clamp is used on a tubular member 43. A bight member 40 is received in the saddle member 44 and tightened with nuts 42 that cause the clamp surfaces to bear against the tubular member to deform it somewhat.

In the method of the present invention, a substantially planar sheet-metal blank 10 shown in FIGS. 1 and 2 is the starting workpiece. The blank has two mutually convex first edges 20 that will be the free edges in the finished structure. A pair of second edges 12 extends between free edges 20. Each of the second edges is provided with a recessed region 16 that will provide an edge of a base flange. Regions 14 and 18 of the second edges will provide edges for flanges on the side walls in a later stage of the manufacturing process.

The blank of FIGS. 1 and 2 is progressively stamped into the desired form. The blank is initially folded on lines along and adjacent second edges 12 to form flange portions on them. The blank is also folded slightly along lines extending transversely of the second edges at approximately the ends of edge region 16, as can best be seen in FIG. 4. The resultant workpiece has flange portions on either end, and each flange portion has a region 24 that will extend from the base of the completed structure. Regions 22 and 26 will extend from the side walls of the completed structure.

Further stamping completes the folding and results in a form shown in FIGS. 5 and 6. The workpiece has now been folded to form side wall portions 34 and 36 with a base portion 28 extending between them. The resultant workpiece also has an end wall portion extending between the end margins of the side wall portions. The end wall portions include oppositely extending side regions 22 and 26 and base flange regions 24, base portion 28. The reason for relieving the transverse edges in region 16 is now apparent; the workpiece is folded along lines between corresponding ends of the recess thereby provided, and the recess accommodates the folding of the flange portion.

FIGS. 7 and 8 illustrate the result of the next step, which is the welding of the workpiece at edges 14, 16, and 18. Edge 14 is welded to edge 18, while edge 16 of base flange region 24 is welded to side-wall flange regions 22 and 26, by the weldments 30. As seen, the sidewall flanges 22,26 extend over at least a major portion of the vertical height of the side-wall portions 34,26.

Once all the folding and welding has been accomplished, holes 38 (FIG. 9) are punched in base portion 38 in a conventional manner. Punching the holes after the stamping operations avoids the distortion in their shape that could occur if the punching of the holes were to be performed before the various folding operations, and welding before punching may avoid additional deformation resulting from the punching operation. This sequence is not required, however, and the holes could be provided earlier.

The sequence may also be varied in that the various folding operations need not be segregated in exactly the manner shown. However, the sequence illustrated has proved convenient and quite satisfactory.

The clamp that includes this saddle member is shown in FIG. 10. Holes 38 in saddle member 44 receive threaded end portions 41 of a generally U-shaped bight member 40. Nuts 42 threadedly engage threaded portions 41 to tighten bight member 40 and free ends 20 of the saddle member 44 against the piece to be clamped, indicated by reference numeral 43.

A review of FIGS. 7, 8, 9, and 10 reveals that end wall portions 37 of the saddle member 44 form continuous surfaces with the side wall portions 34 and 36 as well as with base portion 28. The side wall portion 37 is welded along its entire length to avoid both bowing of the side walls and separation of their upper ends under clamping stress. Furthermore, bowing of base 28 and the concomitant convergence of end walls 37 are reduced by the continuity of structure of the end walls 37 and the base portion 28. This mutual reinforcement of the various portions of the saddle member enables high strength to be afforded without an excessively high amount of structural material. Furthermore, as the description above indicates, this structure can be provided through the use of a very simple manufacturing technique.

Having thus described the invention, we claim:

1. A saddle member for a saddle clamp, said saddle member comprising a generally U-shaped body portion provided by a pair of spaced-apart, generally parallel side wall portions and a base portion extending therebetween and end wall portions extending between the side margins of said side wall portions, said end wall portions each comprising oppositely extending side-wall flanges on the side margins of said side wall portions and extending over at least a major portion of the vertical height thereof, base flanges extending from said base portion to said side-wall flanges, and weldments rigidly bonding the opposed edges of said side-wall flanges and bonding the edge of said base flange to said side-wall flanges.

2. The saddle member of claim 1 wherein said weldments extend substantially the entire length of said side-wall flanges.

3. The saddle member of claim 1 wherein said base portion is substantially planar.

4. The saddle member of claim 1 or 3 wherein said side wall portions have matching aligned arcuate free edges opposite said base portion and convex relative thereto.

5. The saddle member of claim 1 wherein said base portion provides a pair of holes therethrough spaced from said side walls and adapted to receive leg portions of a U-shaped bight member.

6. A saddle clamp comprising:

a. a saddle member having a generally U-shaped body portion provided by a pair of spaced-apart, generally parallel side wall portions and a base portion extending therebetween and end wall portions extending between the side margins of said side-wall portions, said end wall portions each comprising oppositely extending side-wall flanges on the side margins of said side wall portions and extending over at least a major portion of the vertical height thereof, base flanges extending from said base portion to said side-wall flanges, and weldments rigidly bonding the opposed edges of said side-wall flanges and bonding the edge of said base flange to said side-wall flanges, said base portion providing a pair of holes therethrough spaced from said side walls and adapted to receive leg portions of a U-shaped bight member;

b. a U-shaped bight member having a pair of parallel leg portions extending through said base-portion holes and an arcuate web portion concave relative to said side wall portions; and c. means for adjustably tightening the space defined between said arcuate portion of said bight member and said base portion of said saddle member.

7. The saddle clamp of claim 6 wherein said leg portions of said bight member include threaded portions on the free ends thereof, and wherein said tightening means includes nuts threadedly engaging said threaded portions of said bight-member leg portions on the other side of said saddle-member web portion and bearing against the outer surface of said saddle-member base portion.

* * * * *